US012520468B2

(12) United States Patent
Kamiya et al.

(10) Patent No.: US 12,520,468 B2
(45) Date of Patent: Jan. 6, 2026

(54) MALFUNCTION DETERMINING DEVICE AND MALFUNCTION DETERMINING METHOD FOR COMPONENT MOUNTING MACHINE

(71) Applicant: FUJI CORPORATION, Chiryu (JP)

(72) Inventors: Yuki Kamiya, Toyoake (JP); Shinji Naito, Anjo (JP); Kenji Nakai, Anjo (JP); Daisuke Yamanaka, Kariya (JP)

(73) Assignee: FUJI CORPORATION, Chiryu (JP)

( * ) Notice: Subject to any disclaimer, the term of this patent is extended or adjusted under 35 U.S.C. 154(b) by 820 days.

(21) Appl. No.: 17/760,338

(22) PCT Filed: Feb. 26, 2020

(86) PCT No.: PCT/JP2020/007709
§ 371 (c)(1),
(2) Date: Aug. 8, 2022

(87) PCT Pub. No.: WO2021/171416
PCT Pub. Date: Sep. 2, 2021

(65) Prior Publication Data
US 2023/0084116 A1     Mar. 16, 2023

(51) Int. Cl.
*H05K 13/08* (2006.01)
*H05K 13/04* (2006.01)

(52) U.S. Cl.
CPC ..... *H05K 13/0812* (2018.08); *H05K 13/0409* (2018.08)

(58) Field of Classification Search
CPC .......... H05K 13/0409; H05K 13/0812; H05K 13/0815; H05K 13/0818; H05K 13/083;
(Continued)

(56) References Cited

U.S. PATENT DOCUMENTS 6,640,431 B1 * 11/2003 Yoriki ................ H05K 13/0409
29/760
6,647,138 B1 * 11/2003 Sakaguchi ......... H05K 13/0812
250/559.29
(Continued)

FOREIGN PATENT DOCUMENTS

JP       2008205154 A  *  9/2008
JP       2010135534 A  *  6/2010
(Continued)

OTHER PUBLICATIONS

JP-2010135534-A Translation from FIT database (Year: 2025).*
(Continued)

*Primary Examiner* — Jeffrey T Carley
*Assistant Examiner* — Joshua D Anderson
(74) *Attorney, Agent, or Firm* — Oblon, McClelland, Maier & Neustadt, L.L.P.

(57) ABSTRACT

A malfunction determining device includes a head including a pickup member for picking up a component, a moving device configured to move the head, an inspection section, a determining section, and a notification section. The inspection section executes multiple inspections including a first inspection for performing a mounting operation under control of the head and the moving device to inspect whether the mounting operation is good or bad, and a second inspection for performing a calibration measurement of the head to inspect whether the calibration measurement is good or bad. The determining section determines presence or absence of a malfunction and a malfunction location in the head and the moving device based on a combination of results of the multiple inspections.

7 Claims, 11 Drawing Sheets

(58) Field of Classification Search
CPC .............. H05K 13/089; Y10T 29/4913; Y10T 29/49131; Y10T 29/53174; Y10T 29/53178
See application file for complete search history.

(56) References Cited

U.S. PATENT DOCUMENTS

| | | | |
|---|---|---|---|
| 6,910,262 B2* | 6/2005 | Shimizu | H05K 13/0452 29/721 |
| 2002/0108239 A1* | 8/2002 | Isogai | H05K 13/089 29/832 |
| 2006/0085973 A1* | 4/2006 | Kodama | H05K 13/087 294/64.2 |
| 2009/0000110 A1* | 1/2009 | Maenishi | H05K 13/041 29/832 |
| 2018/0199480 A1* | 7/2018 | Taniguchi | H05K 13/0815 |
| 2019/0133010 A1* | 5/2019 | Sakurayama | H05K 13/0404 |

FOREIGN PATENT DOCUMENTS

| | | | |
|---|---|---|---|
| JP | 2012-186260 A | | 9/2012 |
| JP | 2013038339 A | * | 2/2013 |
| JP | 2013-80746 A | | 5/2013 |
| JP | 2017-73431 A | | 4/2017 |
| JP | 2019-62163 A | | 4/2019 |

OTHER PUBLICATIONS

JP-2013038339-A Translation from FIT database (Year: 2025).*
JP-2008205154-A translation from FIT database (Year: 2025).*
International Search Report Issued Apr. 21, 2020, in PCT/JP2020/007709, filed on Feb. 26, 2020, citing documents 15-16 therein, 2 pages.

* cited by examiner

| | ΔXp MOUNTING DEVIATION AMOUNT IN X-Axis DIRECTION | ΔXp MOUNTING DEVIATION AMOUNT IN Y-Axis DIRECTION | Δθp ANGLE DEVIATION AMOUNT |
|---|---|---|---|
| NOZZLE 1 | *** | *** | *** |
| NOZZLE 2 | *** | *** | *** |
| NOZZLE 3 | *** | *** | *** |
| ⋮ | ⋮ | ⋮ | ⋮ |
| NOZZLE N | *** | *** | *** |

| ZS-Axis INCLINATION | | X-Axis DIRECTION INCLINATION AMOUNT Xzs | *** |
|---|---|---|---|
| | | Y-Axis DIRECTION INCLINATION AMOUNT Xzs | *** |
| NOZZLE MOUNTING POSITION | NOZZLE 1 | X-Axis DIRECTION INCLINATION AMOUNT Xn | *** |
| | | Y-Axis DIRECTION INCLINATION AMOUNT Yn | *** |
| | NOZZLE 2 | X-Axis DIRECTION INCLINATION AMOUNT Xn | *** |
| | | Y-Axis DIRECTION INCLINATION AMOUNT Yn | *** |
| | ⋮ | ⋮ | ⋮ |

(a)

(b)

MALFUNCTION DETERMINING DEVICE AND MALFUNCTION DETERMINING METHOD FOR COMPONENT MOUNTING MACHINE

TECHNICAL FIELD

The present specification discloses a malfunction determining device and a malfunction determining method of a component mounting machine.

BACKGROUND ART

In the related art, in a component mounting line, a malfunction detecting system for detecting a malfunction of a device during manufacturing of a mounting board is known (refer to Patent Literature 1, for example). The system includes a data collection section, a determining section, and a notification processing section. The data collection section collects operation status data from a component mounting line including multiple component mounting machines. The determining section determines whether the tendency of one or more feature amount data included in the operation status data collected by the data collection section deviates from the tendency of the feature amount data at the time of normal operation. When the determining section determines that the tendency of the feature amount data deviates from the tendency at the time of normal processing, the notification processing section causes a display section to notify that the device corresponding to the feature amount data is malfunctioning.

PATENT LITERATURE

Patent Literature 1: JP-A-2019-62163

BRIEF SUMMARY

Technical Problem

Incidentally, as one of the methods for inspecting the malfunction of a device, it is conceivable to inspect whether the mounting accuracy is good or bad by measuring the deviation of a mounting location after a mounting operation for picking up a component and mounting the component on a board is performed. In this case, even if the inspection result indicates that there is a malfunction, if it is not known where the malfunction location is, an operator will require a long work time to investigate the malfunction location, and the work load will be excessive.

It is a main object of the present disclosure to provide a malfunction determining device capable of determining the malfunction location of a component mounting machine including a head and a moving device for mounting a component on a board when it is determined that the component mounting machine is malfunctioning.

Solution to Problem

The present disclosure employs the following means in order to achieve the above-mentioned main object.

A malfunction determining device of a component mounting machine according to the present disclosure includes a head including a pickup member for picking up a component, a moving device configured to move the head, an inspection section configured to execute multiple inspections including a first inspection for performing a mounting operation under control of the head and the moving device to inspect whether the mounting operation is good or bad and a second inspection for performing a calibration measurement of the head to inspect whether the calibration measurement is good or bad, and a determining section configured to determine presence or absence of a malfunction and a malfunction location in the head and the moving device based on a combination of results of the multiple inspections.

In the first inspection, data is measured in association with an operation of the parts constituting the head and an operation of the parts constituting the moving device. On the other hand, in the second inspection, data is measured in association with the operation of the parts constituting the head. Therefore, according to the malfunction determining device of a component mounting machine according to the present disclosure, it is possible to appropriately determine presence or absence of a malfunction and a malfunction location in the head and the moving device based on a combination of a result of the first inspection and a result of the second inspection.

DESCRIPTION OF EMBODIMENTS

Figure 1:
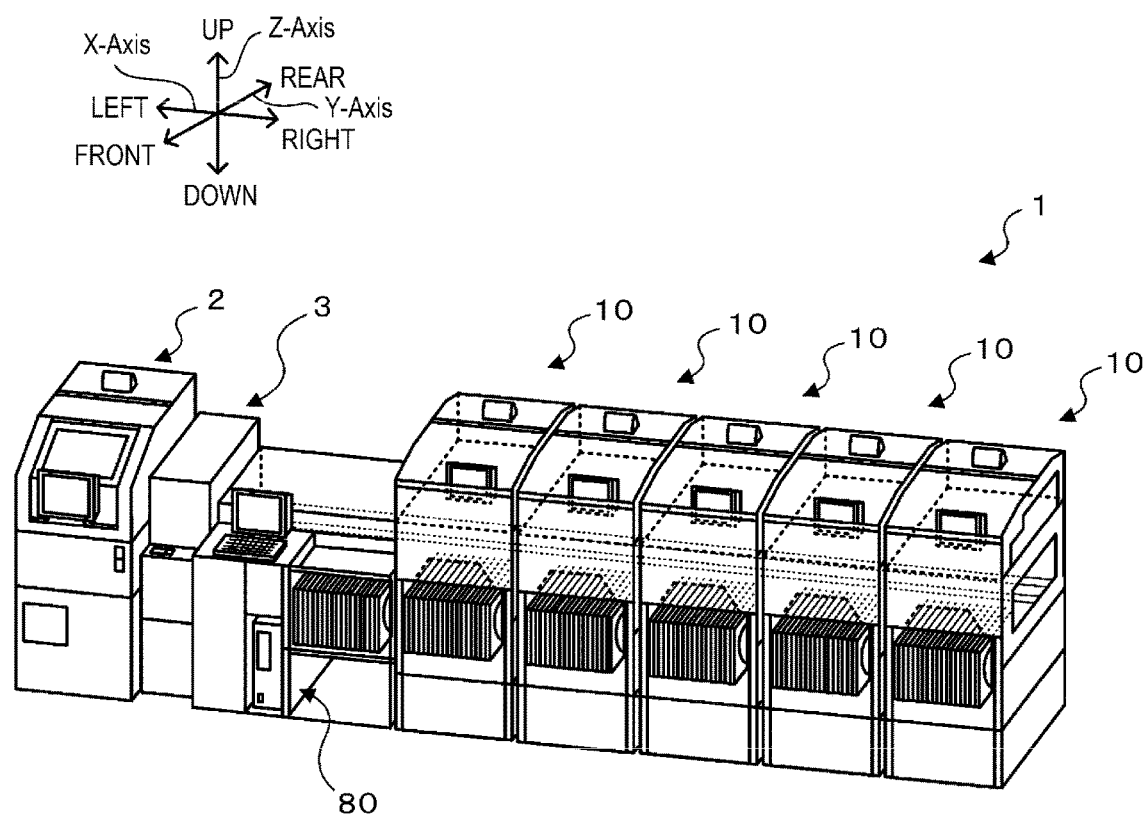
FIG. 1 is a schematic configuration diagram of a component mounting system.
Figure 2:
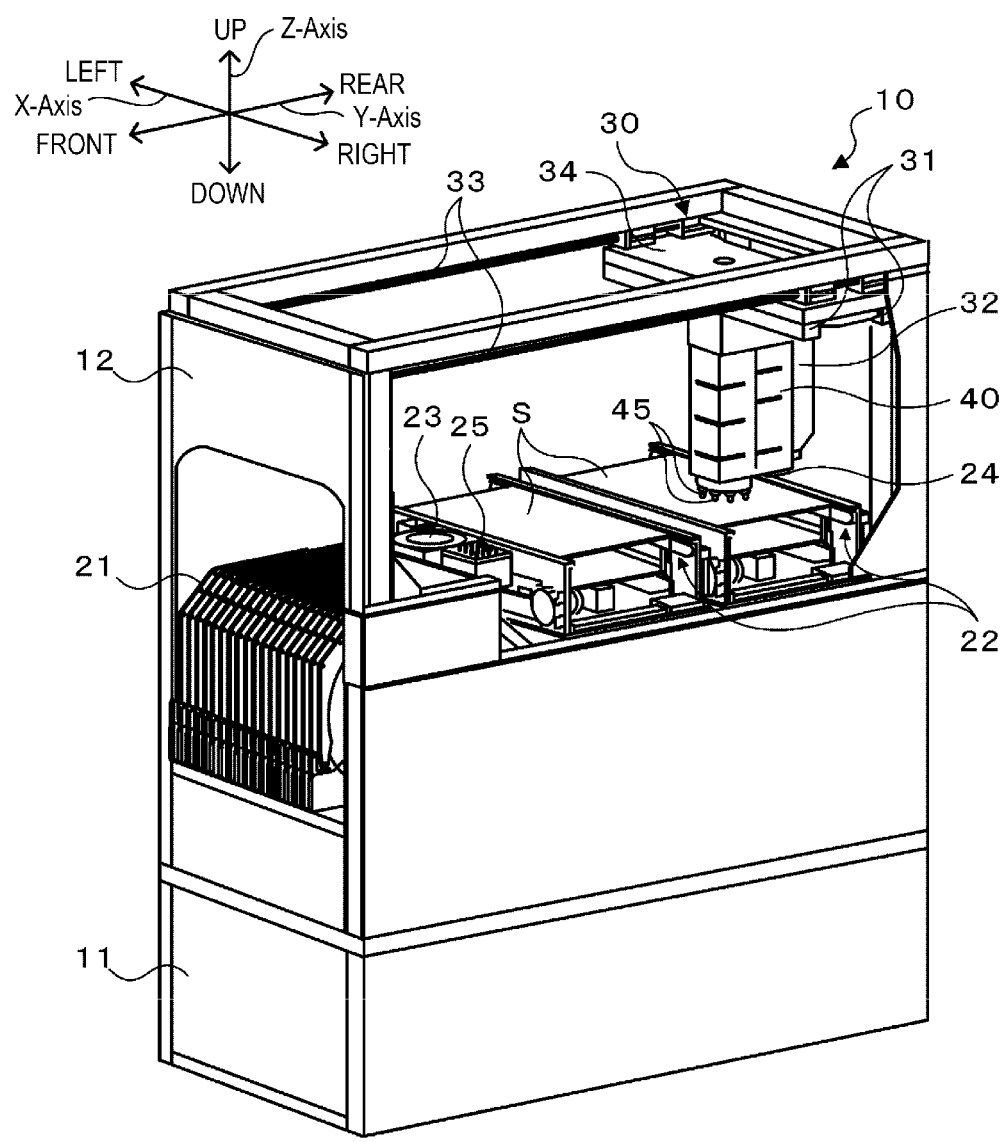
FIG. 2 is a schematic configuration diagram of a component mounting machine.
Figure 3:
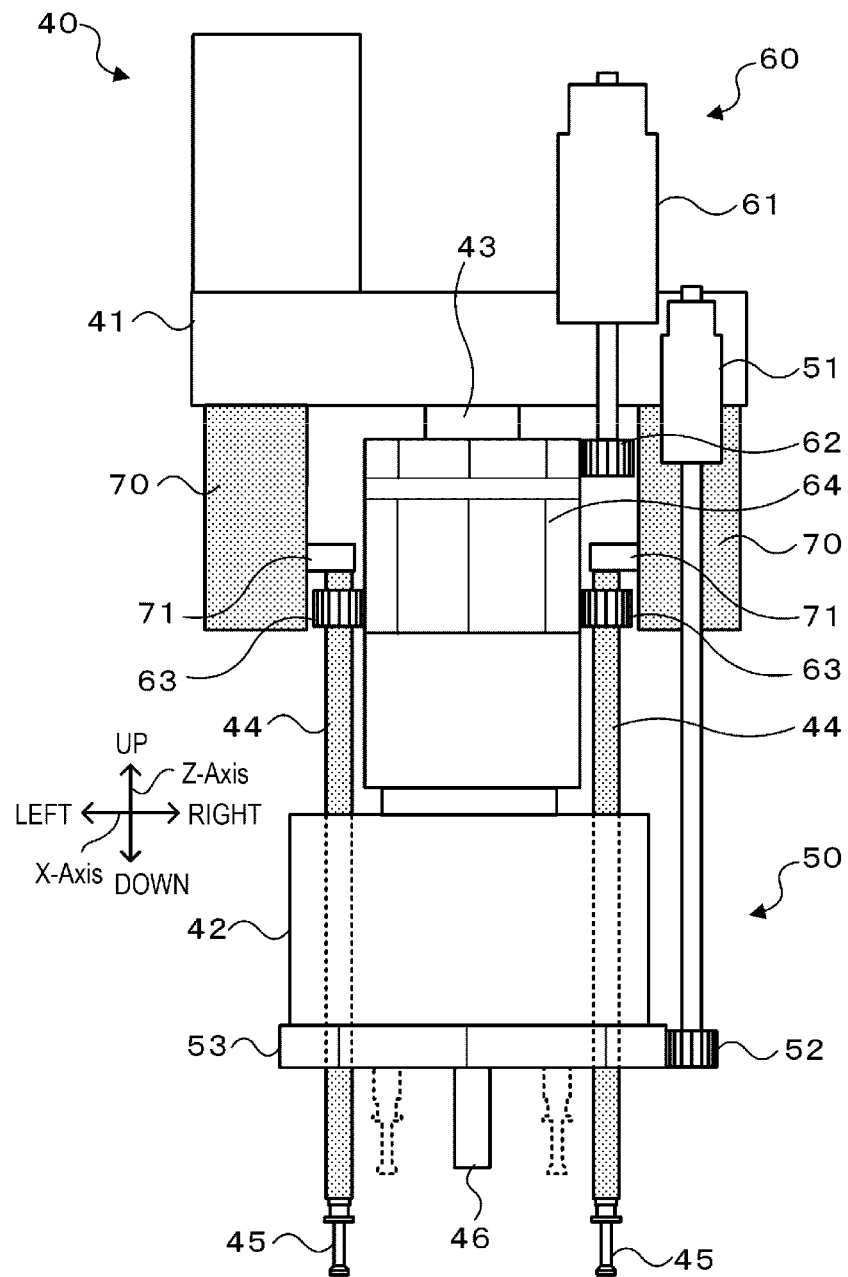
FIG. 3 is a schematic configuration diagram of a mounting head.
Figure 4:
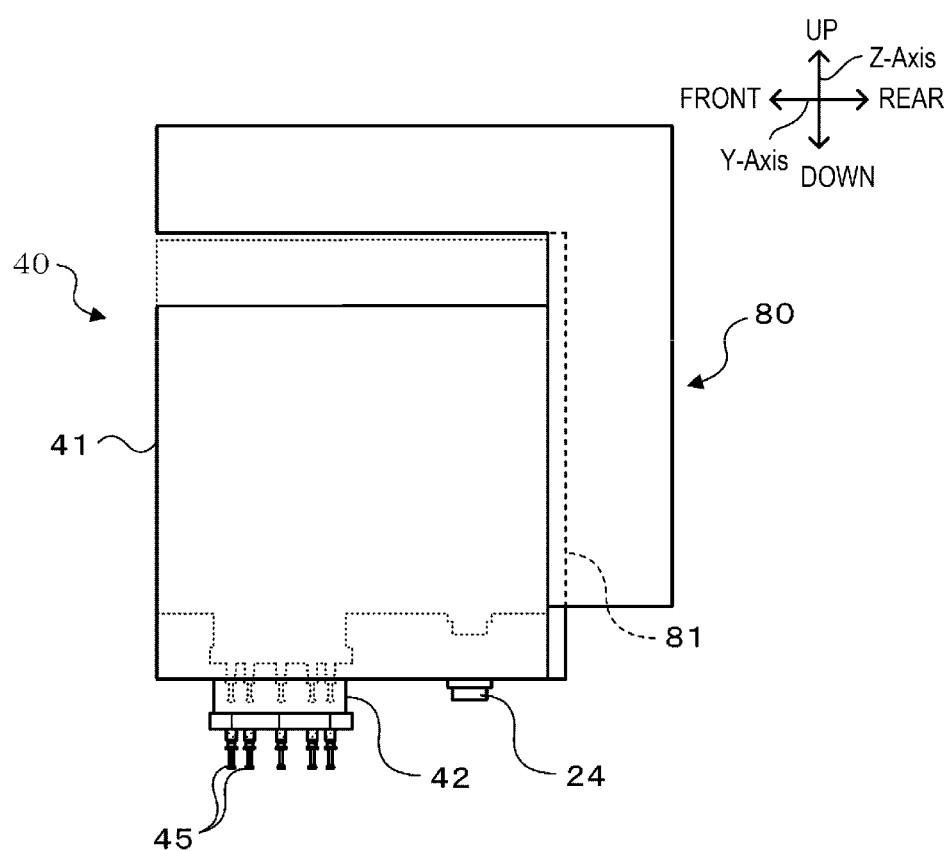
FIG. 4 is a schematic configuration diagram of a ZS-axis driving device.
Figure 5:
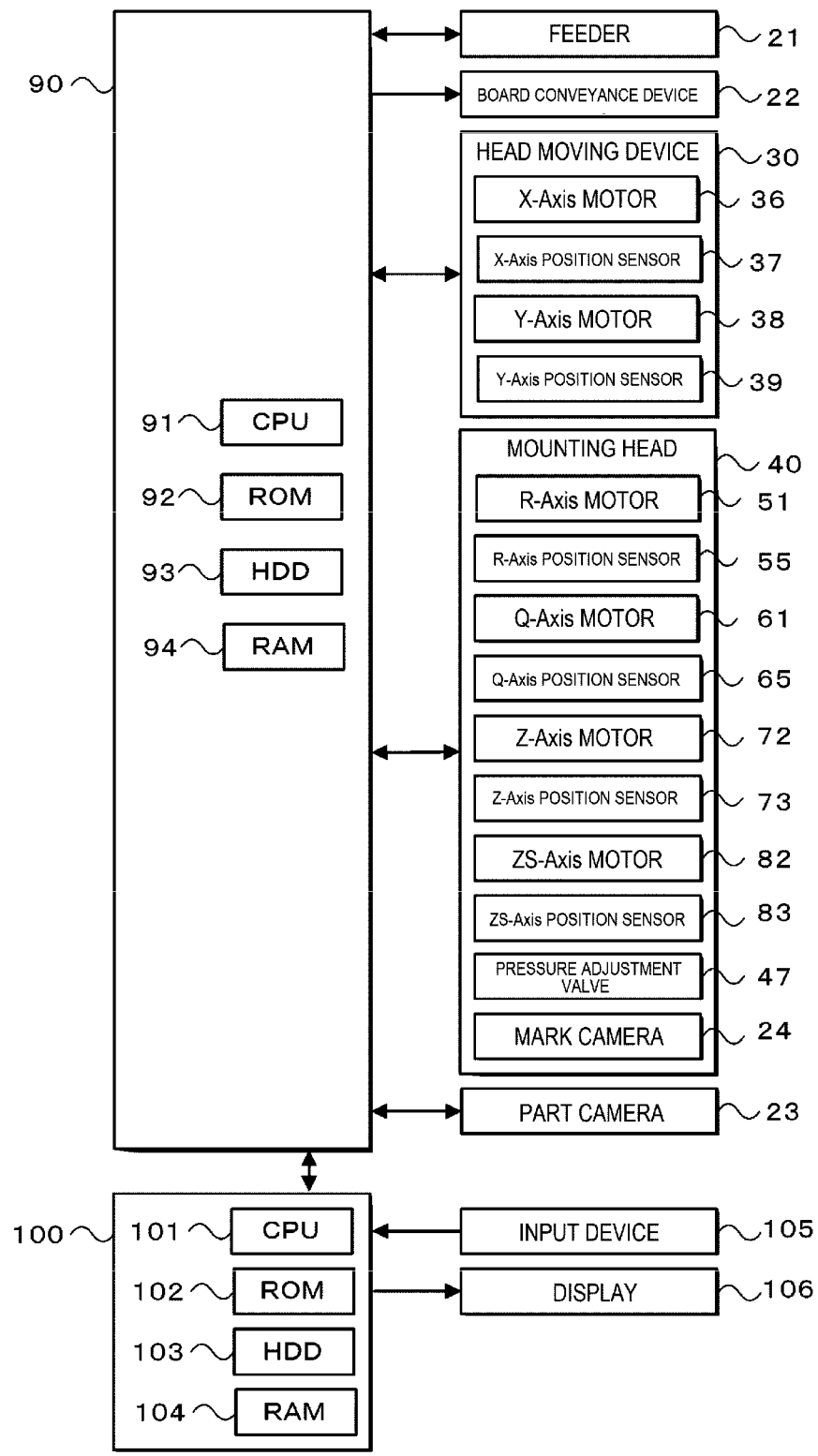
FIG. 5 is a block diagram illustrating an electrical connection relationship between a control device and a management device of the component mounting machine.

Next, an embodiment of the present disclosure will be described with reference to drawings. FIG. 1 is a schematic configuration diagram of a component mounting system. FIG. 2 is a top view of a component mounting machine. FIG. 3 is a schematic configuration diagram of a mounting head. FIG. 4 is a schematic configuration diagram of a ZS-axis driving device. FIG. 5 is a block diagram illustrating an electrical connection relationship between a control device and a management device of the component mounting machine. In FIGS. 1 and 2, a left-right direction is set as an X-axis direction, a front-rear direction is set as a Y-axis direction, and an up-down direction is set as a Z-axis direction.

As illustrated in FIG. 1, component mounting system 1 includes printer 2, print inspection device 3, multiple component mounting machines 10, mounting inspection device (not illustrated), and management device 100 (refer to FIG. 5) that manages the entire system. Printer 2 is a device for printing solder on board S. Print inspection device 4 is a device for inspecting a state of solder printed by printer 2. Component mounting machine 10 is a device for mounting a component on board S. The mounting inspection device is a device for inspecting a mounting state of a component mounted on component mounting machine 10. Printer 2, print inspection device 3, multiple component mounting machines 10, and the mounting inspection device are arranged and installed in this order in the conveyance direction of board S to constitute a production line.

As illustrated in FIG. 2, component mounting machine 10 includes housing 12 mounted on base 11, feeder 21, board conveyance device 22, head moving device 30, mounting head 40, and control device 90 (refer to FIG. 5). In addition to these, component mounting machine 10 also includes part camera 23, mark camera 24, nozzle station 25, and the like. Part camera 23 is provided between feeder 21 and board conveyance device 22 for imaging component P picked up by suction nozzle 45 of mounting head 40 from the bottom side. Mark camera 24 is provided on mounting head 40 for imaging and reading a reference mark affixed to board S from the top side. In addition, nozzle station 25 accommodates multiple types of suction nozzles for replacement, as well as jig nozzle IN used for calibration measurement of mounting head 40 described later.

As illustrated in FIG. 2, feeders 21 are arranged on a front face portion of component mounting machine 10 along an X-axis direction (left-right direction). Although not illustrated, feeder 21 includes a tape reel around which a tape is wound, and a tape feeding mechanism that pulls the tape from the tape reel and feeds the tape to a component supply position. Cavities are formed in the tape at predetermined intervals along the longitudinal direction of the tape. Component P is accommodated in the cavity. Feeder 21 feeds the tape by a predetermined amount by a feeder feeding mechanism (motor), thereby sequentially supplying components P accommodated in the tape to the component supply position. Component P housed in the tape is protected by a film covering the surface of the tape, and when the film is peeled off before the component supply position, component P is exposed at the component supply position, and component P can be picked up by suction nozzle 45.

Board conveyance device 22 includes a pair of conveyor belts that are provided at intervals in the front-rear direction of FIG. 1 and spanned in the X-axis direction (the left-right direction). Board S is conveyed from the left to the right in the drawing by the conveyor belt of board conveyance device 22.

Head moving device 30 moves mounting head 40 in the XY-axis direction (front-rear left-right direction), and includes X-axis slider 32 and Y-axis slider 34, as illustrated in FIG. 2. X-axis slider 32 is supported by a pair of upper and lower X-axis guide rails 31 provided on the bottom face of Y-axis slider 34 so as to extend in the X-axis direction (the left-right direction), and is movable in the X-axis direction by the driving of X-axis motor 36 (refer to FIG. 5). Y-axis slider 34 is supported by a pair of left and right Y-axis guide rails 33 provided on the upper stage portion of housing 12 so as to extend in the Y-axis direction (the front-rear direction), and is movable in the Y-axis direction by the driving of Y-axis motor 38 (refer to FIG. 5). The position of X-axis slider 32 in the X-axis direction is detected by X-axis position sensor 37 (refer to FIG. 5), and the position of Y-axis slider 34 in the Y-axis direction is detected by Y-axis position sensor 39 (refer to FIG. 5). Mounting head 40 is attached to X-axis slider 32. Therefore, mounting head 40 is movable along an XY plane (horizontal plane) by driving and controlling head moving device 30 (X-axis motor 36 and Y-axis motor 38).

Mounting head 40 is configured as a rotary head, and as illustrated in FIG. 3, includes head main body 41, rotation body 42, multiple nozzle holders 44 (eight in the embodiment), multiple suction nozzles 45 (eight in the embodiment), R-axis driving device 50, Q-axis driving device 60, two Z-axis driving devices 70, and ZS-axis driving device 80 (refer to FIG. 4).

Rotation body 42 is rotatably supported by head main body 41 via rotation axis 43 coaxially coupled. Mark forming member 46 on which a reference mark (head reference mark HM) detected by a camera (part camera 23) is formed is provided at an axial center of the lower surface of rotation body 42.

Nozzle holders 44 are arranged at predetermined angular intervals (in the embodiment, at intervals of 45 degrees) on the same circumference about the axial center of rotation body 42, and are supported so as to be freely lifted and lowered by rotation body 42. Suction nozzle 45 is mounted on the distal end portion of nozzle holder 44. Suction nozzle 45 includes a suction port at the distal end, and picks up component P by a negative pressure supplied from a negative pressure source (not illustrated) to the suction port via pressure adjustment valve 47 (refer to FIG. 5). Suction nozzle 45 is detachable from nozzle holder 44, and is replaced with a nozzle suitable for picking up component P according to the type of component P to be picked up.

R-axis driving device 50 rotates rotation body 42 to pivot (revolve) multiple nozzle holders 44 (multiple suction nozzles 45) circumferentially around the center axis of rotation body 42. As illustrated in FIG. 3, R-axis driving device 50 includes R-axis motor 51, driving gear 52 provided on the rotation axis of R-axis motor 51, and R-axis gear 53 coaxially provided on the outer circumferential surface of rotation body 42 and having external teeth meshing with driving gear 52. R-axis driving device 50 rotates rotation body 42 by rotationally driving R-axis gear 53 by R-axis motor 51. Each nozzle holder 44 pivots (revolves) in the circumferential direction integrally with suction nozzle 45 by the rotation of the rotation body 42. In addition, R-axis driving device 50 includes R-axis position sensor 55 (refer to FIG. 5) for detecting the rotational position of R-axis gear 53, that is, the pivoting position of each nozzle holder 44 (suction nozzle 45).

Q-axis driving device 60 rotates (spins) each nozzle holder 44 (each suction nozzle 45) about the center axis thereof. As illustrated in FIG. 3, Q-axis driving device 60 includes Q-axis motor 61, driving gear 62 provided on the rotation axis of Q-axis motor 61, pinion gear 63 provided coaxially with each nozzle holder 44, and Q-axis gear 64 meshing with driving gear 62 and meshing with each pinion gear 63. Pinion gear 63 is provided on the upper portion of each nozzle holder 44 and slidably meshes with Q-axis gear 64 in the Z-axis direction (up-down direction). Q-axis gear 64 is configured as a cylindrical member inserted so as to be coaxial with and relatively rotatable with rotation axis 43. Q-axis driving device 60 rotationally drives Q-axis gear 64 by Q-axis motor 61, thereby collectively rotating each pinion gear 63 meshing with Q-axis gear 64 in the same direction. Each nozzle holder 44 rotates (spins) about the center axis thereof integrally with suction nozzle 45 by the rotation of pinion gear 63. In addition, Q-axis driving device 60 includes Q-axis position sensor 65 (refer to FIG. 5) for detecting the rotational position of Q-axis gear 64, that is, the rotational position of each nozzle holder 44 (suction nozzle 45).

Each Z-axis driving device 70 is configured to individually lift and lower nozzle holder 44 at two locations on the pivot (revolving) trajectory of nozzle holder 44. Suction nozzle 45 attached to nozzle holder 44 moves up and down together with nozzle holder 44. Any of Z-axis driving devices 70 includes Z-axis slider 71 and Z-axis motor 72 for lifting and lowering Z-axis slider 71, as illustrated in FIG. 3. In addition, each Z-axis driving device 70 also includes Z-axis position sensor 73 (refer to FIG. 5) for detecting the lifting and lowering position of corresponding Z-axis slider 71, that is, the lifting and lowering position of corresponding nozzle holder 44 (suction nozzle 45). Each Z-axis driving device 70 drives Z-axis motor 72 to lift and lower corresponding Z-axis slider 71, thereby contacting nozzle holder 44 located below Z-axis slider 71 to lift and lower nozzle holder 44 integrally with suction nozzle 45. Each Z-axis driving device 70 may be configured by using a linear motor, or may be configured by using a rotation motor and a feeding screw mechanism.

ZS-axis driving device 80 is a device for lifting and lowering mounting head 40 (head main body 41) in the up-down direction (ZS-axis direction). As illustrated in FIG. 4, ZS-axis driving device 80 includes guide rail 81 extending in the ZS-axis direction, and ZS-axis motor 82 for lifting and lowering head main body 41 along guide rail 81. In addition, ZS-axis driving device 80 includes ZS-axis position sensor 83 (refer to FIG. 5) for detecting the up-down position of head main body 41. ZS-axis driving device 80 may be configured by using a linear motor, or may be configured by using a rotation motor and a feeding screw mechanism. In a case where, for example, component P having a low height is picked up and mounted, since component mounting machine 10 can shorten the up-down stroke of suction nozzle 45 by lowering mounting head 40 in advance, the operation time can be shortened. On the other hand, in a case where component P having a high height is picked up and mounted, component mounting machine 10 can prevent suction nozzle 45 from interfering with component P when performing the suction operation by lifting mounting head 40 in advance. As a result, component mounting machine 10 can handle multiple types of components P having different heights without replacing mounting head 40.

As illustrated in FIG. 5, control device 90 is configured as a microprocessor centered on CPU 91, and includes ROM 92, HDD 93, RAM 94, an input/output interface (not illustrated), and the like in addition to CPU 91. Various detection signals from X-axis position sensor 37, Y-axis position sensor 39, R-axis position sensor 55, Q-axis position sensor 65, Z-axis position sensor 73, ZS-axis position sensor 83, and the like are input to control device 90 via the input/output interface. In addition, image signals and the like from part camera 23 and mark camera 24 are also input to control device 90 via the input/output interface. On the other hand, control device 90 outputs various control signals to feeder 21, board conveyance device 22, X-axis motor 36, Y-axis motor 38, R-axis motor 51, Q-axis motor 61, Z-axis motor 72, ZS-axis motor 82, pressure adjustment valve 47, mark camera 24, part camera 23, and the like via the input/output interface.

As illustrated in FIG. 5, management device 100 is a general-purpose computer including CPU 101, ROM 102, HDD 103 (storage device), RAM 104, and the like. Input signals from input device 105 including a mouse and a keyboard are input to management device 100. Management device 100 outputs a display signal to display 106.

Next, the operation of component mounting machine 10 according to the embodiment configured as described above will be described. First, CPU 91 of control device 90 controls head moving device 30 so that suction nozzle 45 moves above the component supply position of feeder 21 that supplies component P to be picked up. CPU 91 controls corresponding Z-axis driving device 70 so that suction nozzle 45 moves down, and controls pressure adjustment valve 47 so that the negative pressure is supplied to the suction port of suction nozzle 45. As a result, component P is picked up by suction nozzle 45.

When component P is picked up by suction nozzle 45, CPU 91 controls head moving device 30 so that mounting head 40 moves above part camera 23, and images component P picked up by suction nozzle 45 by part camera 23 from the bottom side. Subsequently, CPU 91 processes the captured image, measures the suction deviation amount of component P picked up by suction nozzle 45 (each suction deviation amount in the X-axis direction and the Y-axis direction) (suction inspection), and corrects the mounting position of board S based on the measured suction deviation amount. Next, CPU 91 controls head moving device 30 so that component P picked up by suction nozzle 45 is located above the corrected mounting position. Then, CPU 91 controls corresponding Z-axis driving device 70 so that suction nozzle 45 moves down, and controls pressure adjustment valve 47 so that the supply of the negative pressure to the suction port of suction nozzle 45 is canceled. As a result, component P is mounted on the mounting position of board S.

Figure 6:
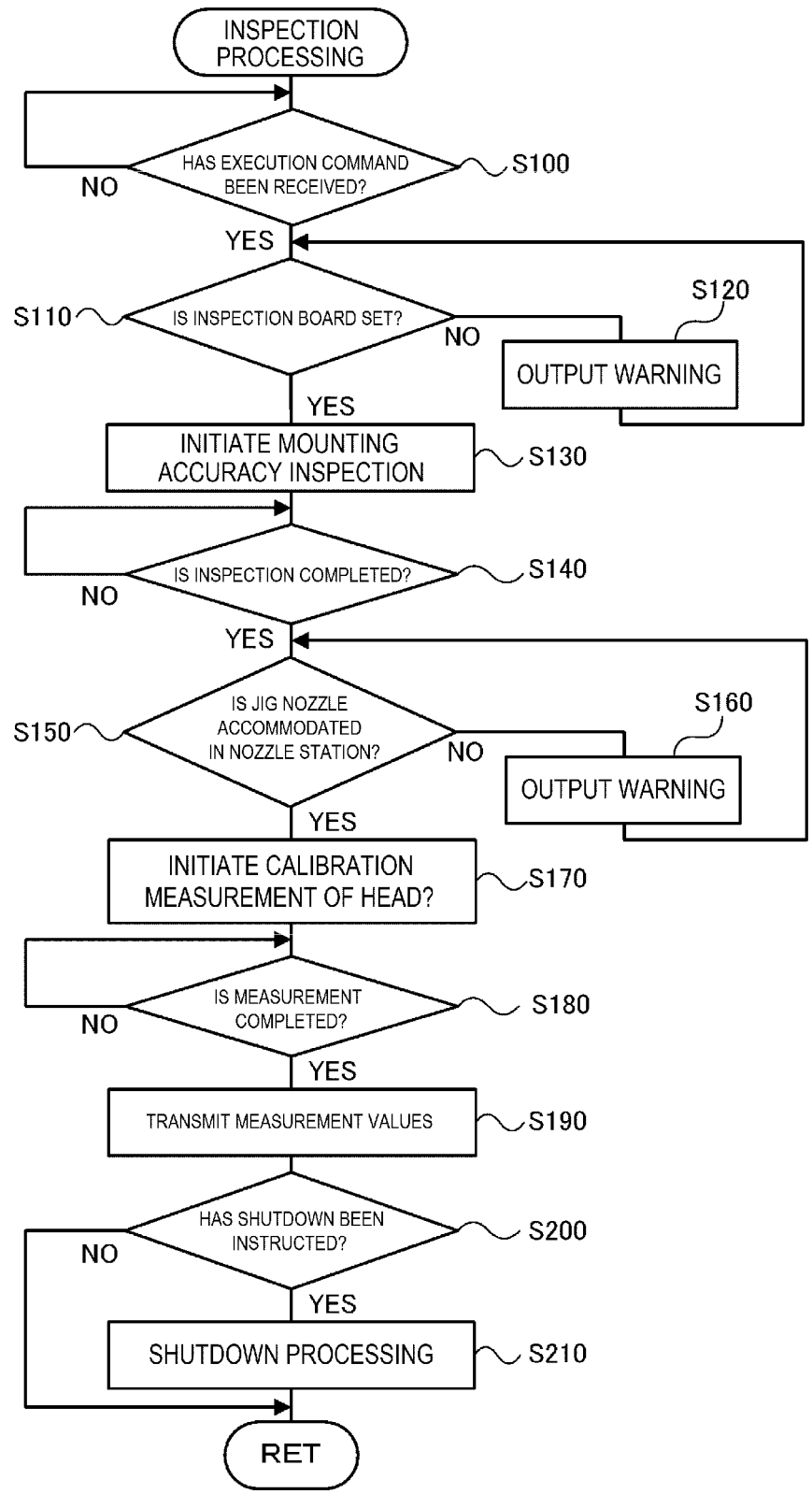
FIG. 6 is a flowchart illustrating an example of inspection processing.

Next, inspection processing for inspecting component mounting machine 10 and malfunction determination processing for determining presence or absence of a malfunction and a malfunction location based on an inspection result will be described. FIG. 6 is a flowchart illustrating an example of inspection processing executed by CPU 91 of control device 90.

In the inspection processing, CPU 91 of control device 90 first determines whether a command to execute an inspection has been received from management device 100 (S100). The command to execute an inspection may be transmitted from management device 100 to control device 90 of each component mounting machine 10, for example, when a predetermined operation is performed by an operator via input device 105. In addition, the command to execute an inspection may be transmitted from management device 100 to control device 90 of each component mounting machine 10 (timer setting), for example, when the setting time registered in advance by an operation of the operator is reached.

Figures 7, 8:
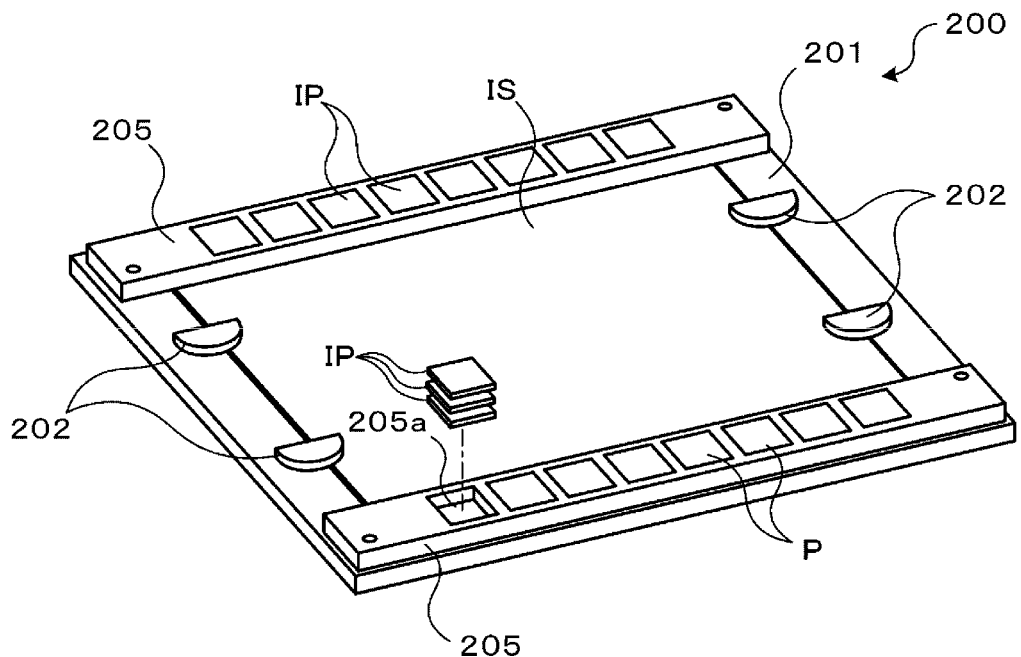
FIG. 7 is an appearance perspective view of a carrier.
FIG. 8 is an explanatory diagram illustrating an example of mounting accuracy data.

When receiving the execution command, CPU 91 next determines whether inspection board IS for performing a mounting accuracy inspection, which is one of the inspections, is set in board conveyance device 22 (S110). Inspection board IS is, for example, a rectangular plate-shaped member having an identification mark detectable by a camera on the surface thereof, and is held by carrier 200 together with inspection component IP. FIG. 7 is an appearance perspective view of carrier 200. As illustrated in the drawing, carrier 200 includes rectangular carrier main body 201 on which inspection board IS is disposed at the center portion of the surface thereof, and elongated component accommodation tray 205 attached to the outer circumferential portion of the surface of carrier main body 201. Inspection board IS is accommodated in a rectangular recess formed in the center portion of the surface of carrier main body 201, and is held by carrier main body 201 by fastener 202. Multiple inspection components IP are accommodated in multiple component accommodation pockets 205a formed so as to line up in the longitudinal direction on the surface of component accommodation tray 205 in a state of being overlapped respectively. The determination in S110 is performed, for example, by performing an operation of transporting inspection board IS (carrier 200) into the machine by board conveyance device 22, imaging the conveyance position with mark camera 24, processing the captured image, and determining whether an identification mark affixed to inspection board IS can be recognized in the captured image.

When determining that inspection board IS is not set in board conveyance device 22, CPU 91 transmits a predetermined warning signal to management device 100 (S120), and returns to S110. Management device 100 that has received a warning signal displays a message on display 108 prompting the operator to set inspection board IS. When determining that inspection board IS is set in board conveyance device 22, CPU 91 initiates the mounting accuracy inspection (S130).

The mounting accuracy inspection is performed in the following manner. CPU 91 controls head moving device 30 and mounting head 40 so that suction nozzle 45 moves above inspection component IP accommodated in component accommodation pocket 205a and inspection component IP is picked up by suction nozzle 45. Subsequently, CPU 91 controls head moving device 30 and mounting head 40 so that inspection component IP that is picked up moves above a target mounting position of inspection board IS and inspection component IP is mounted on the target mounting position. The mounting operation of inspection component IP with respect to inspection board IS is performed for each suction nozzle 45 provided in mounting head 40. Next, CPU 91 controls head moving device 30 and mark camera 24 so that mark camera 24 moves above inspection board IS and mark camera 24 images inspection component IP mounted on inspection board IS. Then, CPU 91 measures the mounting deviation amount of inspection component IP (mounting deviation amount ΔXp in the X-axis direction, mounting deviation amount ΔYp in the Y-axis direction, and angle deviation amount Δθp) with respect to the target mounting position of inspection board IS for each suction nozzle 45 used in the mounting operation by performing the image processing on the captured image. When the measurement is completed, CPU 91 controls head moving device 30 and mounting head 40 so that suction nozzle 45 moves above inspection component IP mounted on inspection board IS and inspection component IP is picked up by suction nozzle 45. Next, CPU 91 controls head moving device 30 and mounting head 40 so that inspection component IP picked up by suction nozzle 45 is accommodated (returned) in a vacant pocket among component accommodation pockets 205a. CPU 91 controls board conveyance device 22 so that carrier 200 accommodating inspection board IS and inspection component IP is transported to downstream component mounting machine 10. As a result, carrier 200 accommodating inspection board IS and inspection component IP is delivered to next component mounting machine 10, and a similar mounting accuracy inspection is executed in next component mounting machine 10. As described above, by sequentially executing the mounting accuracy inspection from the upstream side to the downstream side by multiple component mounting machines 10 constituting the production line, the mounting accuracy inspection of all component mounting machines 10 can be efficiently performed.

FIG. 8 is an explanatory diagram illustrating an example of mounting accuracy data. As illustrated in the drawing, the mounting accuracy data includes mounting deviation amount ΔXp in the X-axis direction, mounting deviation amount ΔYp in the Y-axis direction, and angle deviation amount Δθp as measured values. This mounting accuracy data is generated for each suction nozzle 45 used in the mounting operation.

Figures 9, 10:
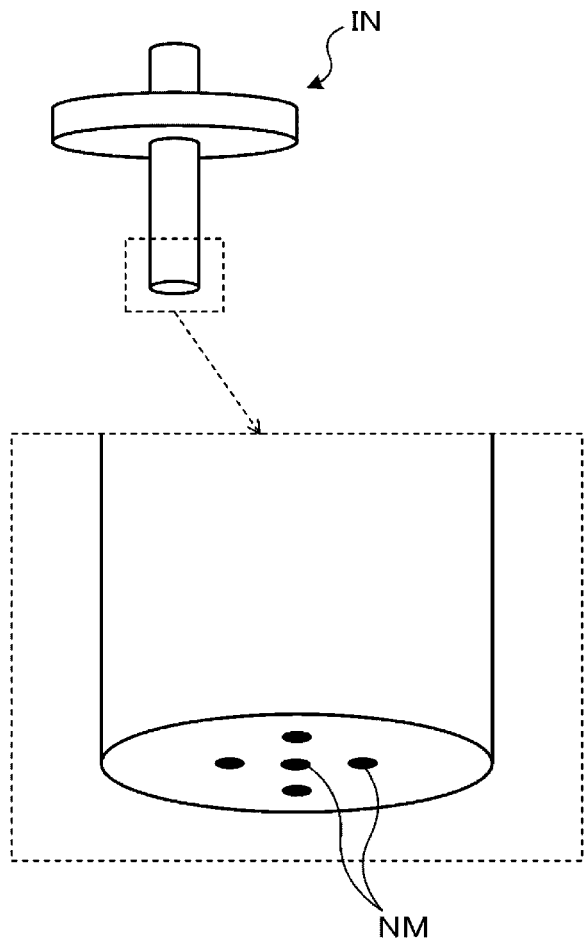
FIG. 9 is a schematic configuration diagram of a jig nozzle.
FIG. 10 is an explanatory diagram illustrating an example of calibration data.

When determining that the mounting accuracy inspection is completed, CPU 91 next determines whether jig nozzle IN used for head calibration measurement is accommodated in nozzle station 25 (S150). FIG. 9 is a schematic configuration diagram of a jig nozzle. Jig nozzle IN has substantially the same outer shape as suction nozzle 45. A reference mark (nozzle reference mark NM) detected by a camera (part camera 23) is formed on the end surface of jig nozzle IN. The processing of S150 is performed, for example, by imaging nozzle station 25 with mark camera 24, processing the captured image, and determining whether the identification mark affixed to jig nozzle IN can be recognized in the captured image. When determining that jig nozzle IN is not accommodated in nozzle station 25, CPU 91 transmits a predetermined warning signal to management device 100 (S160), and returns to S150. Management device 100 that has received a warning signal displays a message on display 108 prompting the operator to accommodate jig nozzle IN. In step S170, when determining that jig nozzle IN is accommodated in nozzle station 25, CPU 91 initiates the head calibration measurement.

The head calibration measurement includes ZS-axis inclination measurement for measuring the inclination of a ZS axis, nozzle mounting position measurement for measuring the mounting position of suction nozzle 45 for each nozzle holder 44 (bending of nozzle holder 44, and the like).

The ZS-axis inclination measurement is performed in the following manner. First, CPU 91 controls ZS-axis driving device 80 so that mounting head 40 moves up to the lifting end in the ZS axis. Subsequently, CPU 91 controls head moving device 30 and part camera 23 so that mark forming member 46 of mounting head 40 moves above part camera 23 and head reference mark HM formed on mark forming member 46 is imaged. Next, CPU 91 controls ZS-axis driving device 80 so that mounting head 40 moves down to the lowering end in the ZS axis, and then controls part camera 23 so that head reference mark HM is imaged in the same manner. That is, CPU 91 images head reference mark HM of mounting head 40 at each position of the lifting end and lowering end in the ZS axis. Then, CPU 91 recognizes each of head reference marks HM by performing image processing on the obtained two captured images, measures the positional deviation amount between the recognized head reference marks HM in the X-axis direction as inclination amount ΔXzs in the X-axis direction, and measures the positional deviation amount in the Y-axis direction as inclination amount ΔYzs in the Y-axis direction.

The nozzle mounting position is measured in the following manner. First, CPU 91 controls head moving device 30 and mounting head 40 so that mounting head 40 moves above nozzle station 25 and jig nozzle IN is mounted on each nozzle holder 44 of mounting head 40. Subsequently, CPU 91 controls head moving device 30 and part camera 23 so that nozzle reference mark NM formed at the distal end of jig nozzle IN is imaged in a state in which jig nozzle IN moves above part camera 23 and jig nozzle IN is located at the lifting end in the Z-axis direction. Next, CPU 91 controls Z-axis driving device 70 so that jig nozzle IN moves down to the lowering end in the Z-axis, and then controls part camera 23 so that nozzle reference mark NM is imaged in the same manner. That is, CPU 91 images nozzle reference mark NM of jig nozzle IN at each position of the lifting end and the lowering end in the Z axis. Then, CPU 91 recognizes each of nozzle reference marks NM by performing image processing on the two obtained captured images, measures the positional deviation amount between recognized nozzle reference marks NM in the X-axis direction as inclination amount $\Delta Xn$ in the X-axis direction, and measures the positional deviation amount in the Y-axis direction as inclination amount $\Delta Yn$ in the Y-axis direction.

FIG. 10 is an explanatory diagram illustrating an example of calibration data. As illustrated in the drawing, the calibration data includes, as measured values, a ZS axis inclination, a nozzle mounting position for each nozzle, and the like. The ZS-axis inclination includes inclination amount $\Delta Xzs$ in the X-axis direction and inclination amount $\Delta Yzs$ in the Y-axis direction. The nozzle mounting position includes inclination amount $\Delta Xn$ in the X-axis direction and inclination amount $\Delta Yn$ in the Y-axis direction.

When determining that the head calibration measurement is completed, CPU 91 transmits the obtained measured values (mounting accuracy data and calibration data) to management device 100 (S190). In step S200, CPU 91 determines whether a shutdown has been instructed. If it is determined that there is no instruction of the shutdown, CPU 91 ends the malfunction inspection processing as it is, whereas if it is determined that there is a instruction of the shutdown, CPU 91 shuts down (S210) and ends the malfunction inspection processing. The shutdown is instructed by the operator inputting in advance to management device 100 via input device 105. In a case where the operator has set the inspection processing to be executed after the day's work is completed, by instructing in advance the shutdown after the inspection is completed, the operator can leave without waiting for the inspection to complete.

Figure 11:
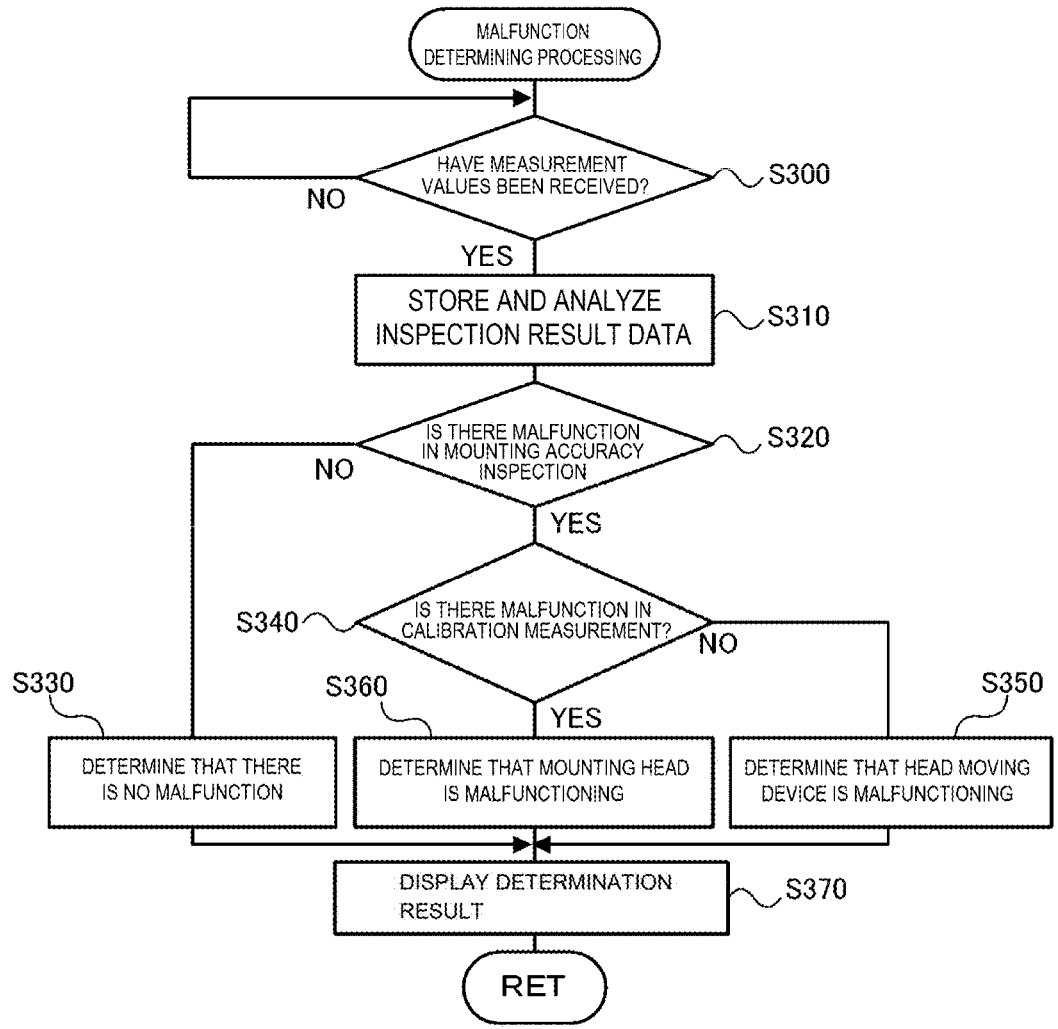
FIG. 11 is a flowchart illustrating an example of malfunction determination processing.

Next, the malfunction determination processing performed by using the result of the malfunction inspection processing will be described. FIG. 11 is a flowchart illustrating an example of the malfunction determination processing executed by CPU 101 of management device 100.

Figure 12:
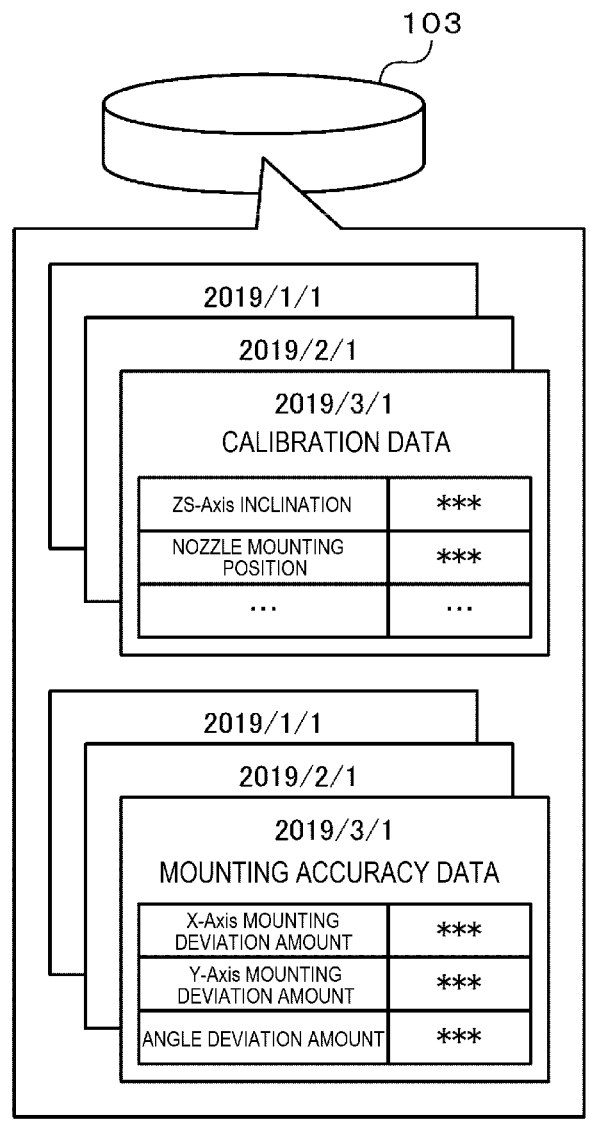
FIG. 12 is an explanatory diagram illustrating an example of measured values stored in a storage device.

In the malfunction determination processing, CPU 101 of management device 100 first waits to receive measured values from component mounting machine 10 (S300). When receiving the measured values, CPU 101 stores the received measured values in HDD 103 (storage device) and analyzes the received measured values (S310). FIG. 12 is an explanatory diagram illustrating an example of the measured values stored in the storage device. As illustrated in the drawing, HDD 103 (storage device) stores the mounting accuracy data and the calibration data as measured values in association with the execution date of the inspection.

The analysis of the mounting accuracy data is performed in the following manner. First, CPU 101 calculates average value $\mu$ and standard deviation a of the deviation amount received so far for each deviation amount among mounting deviation amounts $\Delta Xp$ and $\Delta Yp$, and angular deviation amount $\Delta\theta p$. Subsequently, CPU 101 determines whether the deviation amount received this time falls within a range determined by a lower limit value ($\mu-3\sigma$) obtained by subtracting $3\sigma$ from average value $\mu$ and an upper limit value ($\mu+3\rho$) obtained by adding $3\sigma$ to average value $\mu$, for each deviation amount. The lower limit value and the upper limit value may be a value determined by using $2\sigma$ instead of $3\sigma$, or may be a value determined by using $\sigma$, or may be a value selected by the operator. Then, when determining that any of the deviation amounts received this time falls within the range determined by the lower limit value and the upper limit value (refer to, for example, FIG. 13(*a*), CPU 101 determines that there is no sign of a malfunction ('no malfunction'). On the other hand, when determining that any of the deviation amounts received this time does not fall within the range determined by the lower limit value and the upper limit value (refer to, for example, FIG. 13(*b*)), CPU 101 determines that there is a sign of a malfunction ('malfunction'). As described above, the mounting accuracy inspection is performed by using inspection component IP held by carrier 200 together with inspection board IS, instead of component P supplied from feeder 21. Therefore, the analysis result of the mounting accuracy data is not affected by the malfunction of feeder 21, and reflects the influence of the malfunction of head moving device 30 or mounting head 40.

The analysis of the calibration data (the ZS-axis inclination and the nozzle mounting position) is performed in the following manner. When analyzing the ZS-axis inclination, CPU 101 first calculates average value $\mu$ and standard deviation $\sigma$ of the inclination amount received so far for each inclination amount among inclination amounts $\Delta Xzs$ and $\Delta Yzs$. Subsequently, CPU 101 determines whether the inclination amount received this time falls within a range determined by a lower limit value ($\mu-3\sigma$) obtained by subtracting $3\sigma$ from average value $\mu$ and an upper limit value ($\mu+3\sigma$) obtained by adding $3\sigma$ to average value $\mu$, for each inclination amount. The lower limit value and the upper limit value may be a value determined by using $2\sigma$ instead of $3\sigma$, or may be a value determined by using $\sigma$, or may be a value selected by the operator. Then, when determining that any of the indication amounts received this time falls within the range determined by the lower limit value and the upper limit value, CPU 101 determines that there is no sign of a malfunction ('no malfunction'), and determines that there is an indication of a malfunction ('malfunction') when determining that any of the inclination amounts received this time does not fall within the range determined by the lower limit value and the upper limit value. CUP 101 can also be similarly performed when analyzing the nozzle mounting position (inclination amount $\Delta Xn$ in the X-axis direction and inclination amount $\Delta Yn$ in the Y-axis direction). As described above, the head calibration measurement is performed by operating the parts constituting mounting head 40. Therefore, only the influence of the malfunction of mounting head 40 is reflected in the analysis result of the calibration data.

Figure 13:
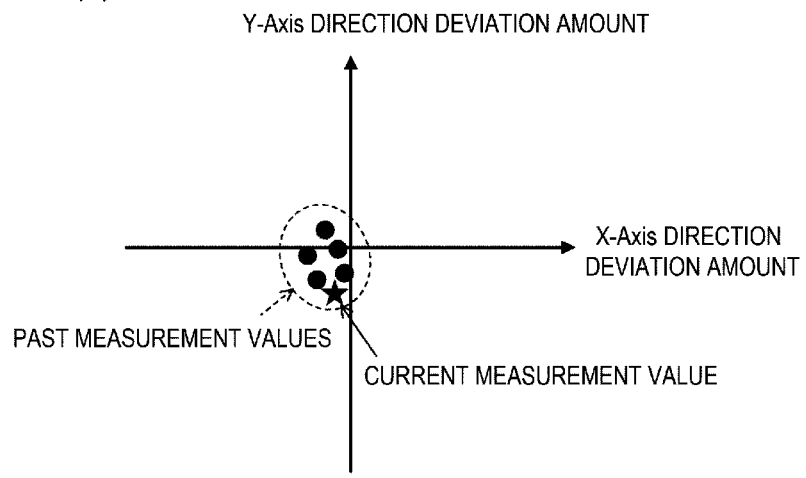
FIG. 13 is an explanatory diagram illustrating an example of an analysis result of the measured values.
Figure 13:
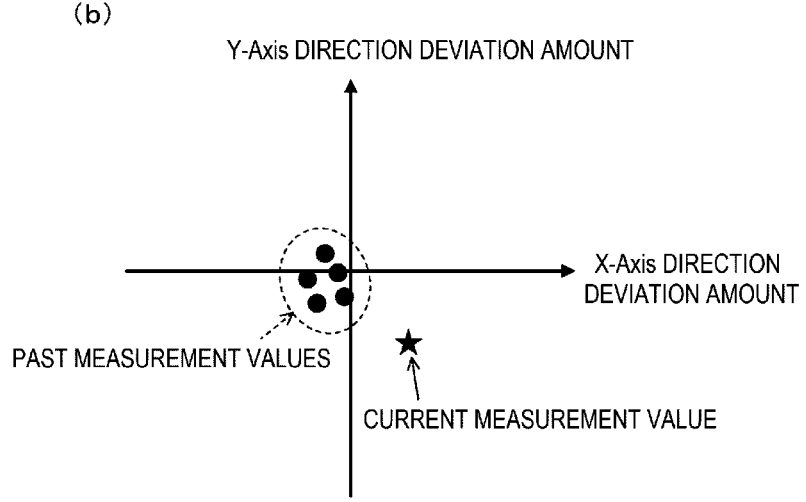

As described above, in the present embodiment, CPU 101 analyzes the measured values by determining whether the measured value received this time falls within a predetermined range of the distribution centered on average value $\mu$ of the measured values received so far (in FIG. 13, the area surrounded by the dashed line). Then, when determining that the measured value received this time falls within the predetermined range (refer to FIG. 13(*a*)), CPU 101 determines that there is no malfunction, and determines that there is a malfunction when determining that the measured value received this time does not fall within the predetermined range (refer to FIG. 13(*b*)).

In step S320, CPU 101 determines whether the result of the mounting accuracy inspection is a result of a malfunction as a result of the analysis of the mounting accuracy data.

When determining that the result of the mounting accuracy inspection is a result of no malfunction, CPU 101 determines that neither head moving device 30 nor mounting head 40 is malfunctioning (S330).

On the other hand, when determining that the result of the mounting accuracy inspection is a result of a malfunction, CPU 101 further determines whether the result of the head calibration measurement is a result of a malfunction (S340). When determining that the result of the head calibration measurement is a result of no malfunction, CPU 101 determines that there is a malfunction in head moving device 30 (S350). On the other hand, when determining that the result of the head calibration measurement is the result of a malfunction, CPU 101 determines that mounting head 40 is malfunctioning (S360).

Figure 14:
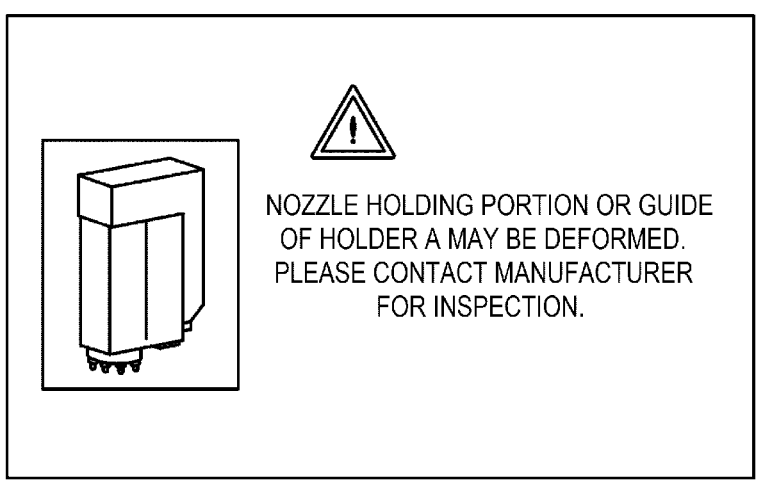
FIG. 14 is an explanatory diagram illustrating an example of a notification screen of a malfunction determination result.

When determining the presence or absence of a malfunction and a malfunction location in this manner, CPU 101 displays the determination result on display 108 (S370) in order to notify the operator of the determination result, and ends the malfunction determination processing. FIG. 14 is an explanatory diagram illustrating an example of a notification screen of a malfunction determination result. The drawing is an example of a notification screen when there is a malfunction in mounting head 40.

Here, a correspondence relationship between main elements of the embodiment and main elements of the present disclosure described in the scope of claims will be described. That is, mounting head 40 of the embodiment corresponds to the head of the present disclosure, head moving device 30 corresponds to a moving device, CPU 91 of control device 90 that executes the inspection processing corresponds to an inspection section, CPU 101 of management device 100 that executes the malfunction determination processing corresponds to a determining section, and display 106 corresponds to a notification section.

It goes without saying that the present disclosure is not limited to the above-mentioned embodiment and may be carried out in various aspects within the technical scope of the present disclosure.

For example, in the above embodiment, in the malfunction determination processing, CPU 101 determines the presence or absence of a malfunction by determining whether the measured value received this time falls within the predetermined range of the distribution centered on average value μ of the measured values received so far. However, CPU 101 may determine the presence or absence of a malfunction by determining whether the measured value received this time falls within a predetermined range centered on a value determined from the tendency of change in the measured values received so far. For example, when the current measured value is set to X0, CPU 101 determines the presence or absence of a malfunction by determining whether the value falls within a range determined by a lower limit value obtained by multiplying tendency Xa of the change in the measured values received so far by coefficient k1 smaller than value 1 and an upper limit value obtained by multiplying tendency Xa by coefficient k2 larger than value 1. However, tendency Xa of the change in the measured values received so far is defined by the following equation (1) when X1 is a measured value received one time before, X2 is a measured value received two times before, Xi is a measured value received i times before, and a1, a2, . . . , ai are weighting parameters, respectively. Predetermined values may be used as coefficients k1 and k2, or values designated by the operator may be used.

$$Xa = X1*a1 + X2*a2 + \ldots + Xi*ai \quad (1)$$

In the above embodiment, CPU 101 determines the malfunction of head moving device 30 and mounting head 40 provided in component mounting machine 10, but may additionally determine the malfunction of feeder 21. The determination of a malfunction of feeder 21 is performed in the following manner. CPU 101 receives the above-described suction deviation amount (each suction deviation amount in the X-axis direction and the Y-axis direction) measured in the suction inspection executed after the suction operation is executed in each component mounting machine 10 from control device 90, and analyzes the received suction deviation amounts. The analysis of the suction deviation amount can be performed in the same manner as the analysis of the mounting accuracy data and the calibration data described above. Then, when the result of the mounting accuracy inspection is a result of no malfunction and the result of the suction inspection is a result of a malfunction, CPU 101 determines that there is a malfunction in feeder 21.

As described above, a malfunction determining device of a component mounting machine according to the present disclosure includes a head configured to include a pickup member for picking up a component, a moving device configured to move the head, an inspection section configured to execute multiple inspections including a first inspection for performing a mounting operation under control of the head and the moving device to inspect whether the mounting is good or bad and a second inspection for performing calibration measurement of the head to inspect whether the measurement is good or bad, and a determining section configured to determine presence or absence of a malfunction and a malfunction location in the head and the moving device based on a combination of results of the multiple inspections.

In such a malfunction determining device of a component mounting machine according to the present disclosure, when the result of the first inspection is a result of a malfunction, the determining section may determine that the moving device is malfunctioning if the result of the second inspection is a result of no malfunction, and may determine that the head is malfunctioning if the result of the second inspection is a result of a malfunction. By doing so, it is possible to more appropriately determine which of the head and the moving device has a malfunction.

In the malfunction determining device of the component mounting machine according to the present disclosure, the inspection section may shut down the component mounting machine after the first inspection and the second inspection are completed. As a result, the operator can leave the holding site after the work is completed without waiting for component mounting machine 10 to end the inspection.

Further, in the malfunction determining device of the component mounting machine according to the present disclosure, the first inspection is an inspection for determining whether the mounting operation is good or bad by sequentially mounting multiple components of the same type on an inspection board by sequentially picking up the multiple components by the pickup member by the pickup member and detecting a positional deviation of each mounted component, and the inspection section initiates the first inspection when the inspection board is set and a command to initiate an inspection is issued.

In the malfunction determining device of the component mounting machine according to the present disclosure, the inspection section may initiate the second inspection when a preset time is reached or when a command to initiate an inspection is issued.

In addition, in the malfunction determining device of the component mounting machine according to the present disclosure, a notification section for notifying of a result of the determination may be provided.

The present disclosure is not limited to the form of the malfunction determining device of the component mounting machine, but may also be the form of the malfunction determining method of the component mounting machine. That is, a malfunction determining method for a component mounting machine according to the present disclosure is a malfunction determining method for a component mounting machine for determining a malfunction of the component mounting machine including a head configured to include a pickup member for picking up a component and a moving device configured to move the head, the method including executing multiple inspections including a first inspection for performing a mounting operation under control of the head and the moving device to inspect whether the mounting is good or bad and a second inspection for performing calibration measurement of the head to inspect whether the measurement is good or bad, and determining presence or absence of malfunction and a malfunction location including the head and the moving device based on a combination of results of the multiple inspections.

INDUSTRIAL APPLICABILITY

The present disclosure can be applied to, for example, the manufacturing industry of a malfunction determining device for a component mounting machine.

REFERENCE SIGNS LIST 1 component mounting system
2 printer
3 print inspection device
4 print inspection device
10 component mounting machine
11 base
12 housing
21 feeder
22 board conveyance device
23 part camera
24 mark camera
25 nozzle station
30 head moving device
31 X-axis guide rail
32 X-axis slider
33 Y-axis guide rail
34 Y-axis slider
36 X-axis motor
37 X-axis position sensor,
38 Y-axis motor
39 Y-axis position sensor
40 mounting head
41 head main body
42 rotation body
43 rotation axis
44 nozzle holder
45 suction nozzle
46 mark forming member
47 pressure adjustment valve
50 R-axis driving device
51 R-axis motor
52 driving gear
53 R-axis gear
55 R-axis position sensor
60 Q-axis driving device
61 Q-axis motor
62 driving gear
63 pinion gear
64 Q-axis gear
65 Q-axis position sensor
70 Z-axis driving device
71 Z-axis slider
72 Z-axis motor
73 Z-axis position sensor
80 ZS-axis driving device
81 guide rail
82 ZS-axis motor
83 ZS-axis position sensor
90 control device
91 CPU
92 ROM
93 HDD
94 RAM
100 management device
101 CPU
102 ROM
103 HDD
104 RAM
105 input device
106 display
108 display
200 carrier
201 carrier main body
202 fastener
205 component accommodation tray
205a component accommodation pocket
HM head reference mark
IN jig nozzle
IP inspection component
IS inspection board
NM nozzle reference mark
P component
S board

The invention claimed is:

1. A component mounting machine including a malfunction determining device comprising:
a head including a pickup member for picking up a component,
a moving device configured to move the head,
an inspection section including circuitry configured to
execute a first inspection for performing a mounting operation under control of the head and the moving device to inspect whether the mounting operation is good or bad by sequentially mounting multiple components of the same type on an inspection board by sequentially picking up and mounting the multiple components by the pickup member by the pickup member and detecting a positional deviation of each mounted component, and
execute a second inspection for performing a calibration measurement of the head to inspect whether the calibration measurement is good or bad by placing a jig nozzle in the head, controlling the moving device so that the jig nozzle is disposed above a camera and lifting the jig nozzle so that the jig nozzle is located in a lifting end in a vertical direction, and lowering the jig nozzle so that the jig nozzle is located in a lowering end in the vertical direction, and controlling the camera to image a reference mark on the jig nozzle when the jig nozzle is located in the lifting end and located in the lowering end and measuring a positional deviation amount of the reference mark between the images when the jig nozzle is located in the lifting end and located in the lowering end, and a determining section including circuitry configured to determine presence or absence of a malfunction in the head and the moving device and determine a malfunction location in the head or the moving device based on a combination of results of the first and second inspections.

2. The component mounting machine according to claim 1, wherein when a result of the first inspection is a malfunction, the determining section determines that the moving device is malfunctioning if a result of the second inspection is no malfunction, and determines that the head is malfunctioning if the result of the second inspection is a malfunction.

3. The component mounting machine according to claim 1, wherein the inspection section shuts down the component mounting machine after the first inspection and the second inspection are completed.

4. The component mounting machine according to claim 1, wherein the inspection section initiates the first inspection when the inspection board is set and a command to initiate an inspection is issued.

5. The component mounting machine according to claim 1, wherein the inspection section initiates the second inspection when a preset time is reached or when a command to initiate an inspection is issued.

6. The component mounting machine according to claim 1, further comprising:

a notification section configured to notify of a result of the determination.

7. A malfunction determining method for a component mounting machine for determining a malfunction of the component mounting machine including a head including a pickup member for picking up a component and a moving device configured to move the head, the method comprising:

executing a first inspection for performing a mounting operation under control of the head and the moving device to inspect whether the mounting operation is good or bad by sequentially mounting multiple components of the same type on an inspection board by sequentially picking up and mounting the multiple components by the pickup member by the pickup member and detecting a positional deviation of each mounted component;

executing a second inspection for performing a calibration measurement of the head to inspect whether the calibration measurement is good or bad by placing a jig nozzle in the head, controlling the moving device so that the jig nozzle is disposed above a camera and lifting the jig nozzle so that the jig nozzle is located in a lifting end in a vertical direction, and lowering the jig nozzle so that the jig nozzle is located in a lowering end in the vertical direction, and controlling the camera to image a reference mark on the jig nozzle when the jig nozzle is located in the lifting end and located in the lowering end and measuring a positional deviation amount of the reference mark between the images when the jig nozzle is located in the lifting end and located in the lowering end; and determining presence or absence of a malfunction in the head and the moving device and determining a malfunction location in the head or the moving device based on a combination of results of the first and second inspections.

* * * * *